E. E. YOST.
POWER DRIVEN LAWN MOWER.
APPLICATION FILED JUNE 7, 1920.
1,387,578.
Patented Aug. 16, 1921.
4 SHEETS—SHEET 1.
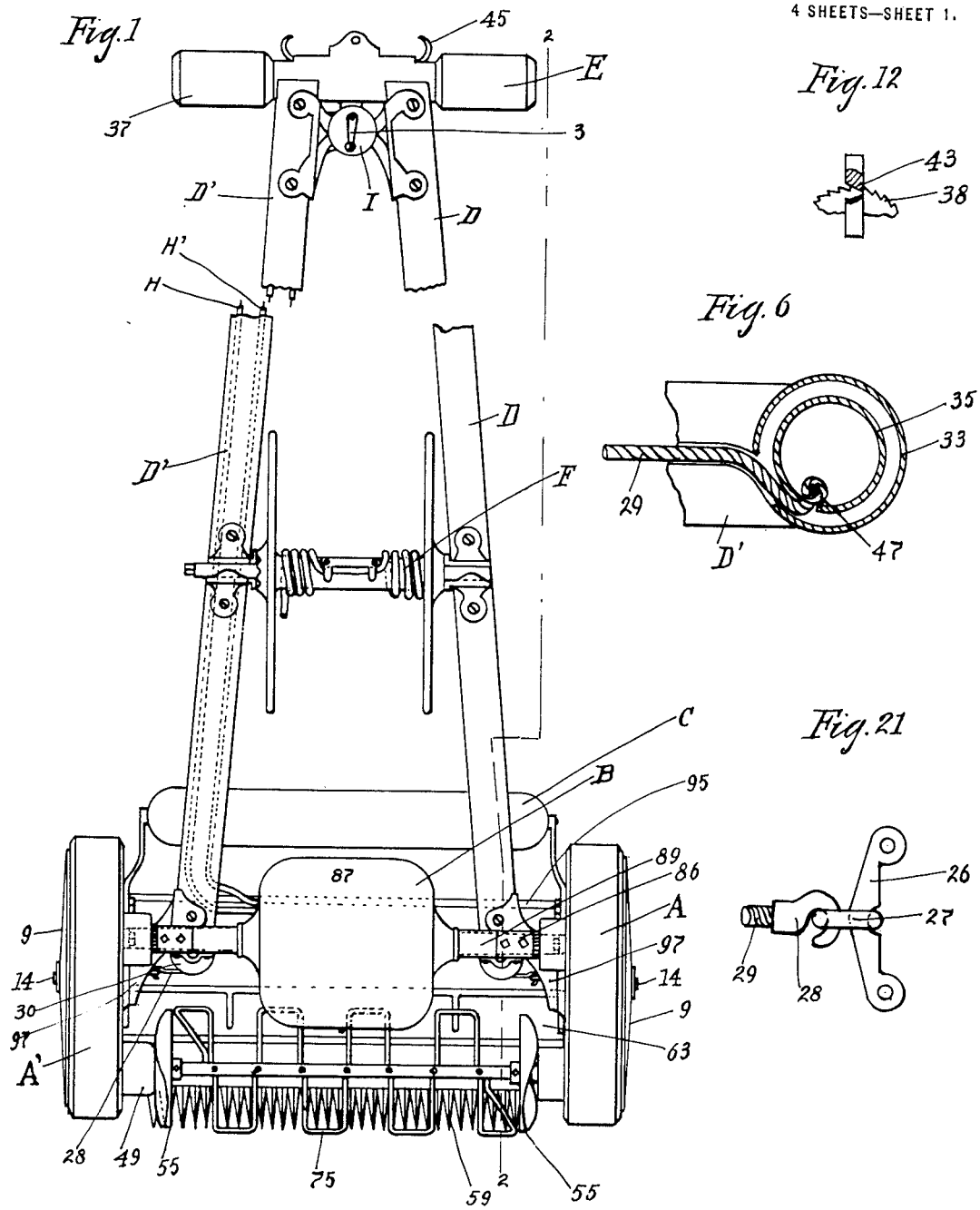
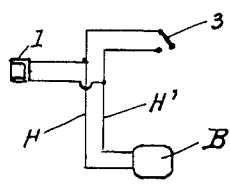
Inventor,
Emil E. Yost
by [signature]
his Attorney.

E. E. YOST.
POWER DRIVEN LAWN MOWER.
APPLICATION FILED JUNE 7, 1920.
1,387,578.
Patented Aug. 16, 1921.
4 SHEETS—SHEET 2.
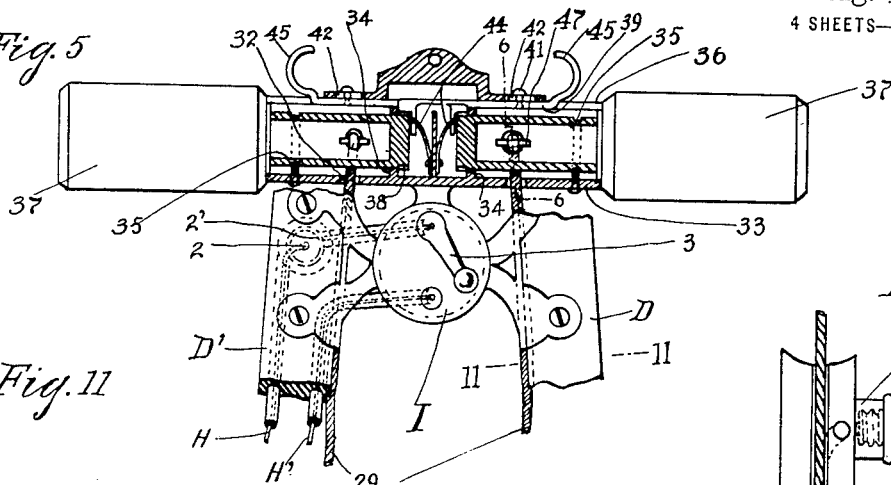
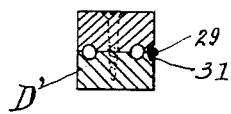
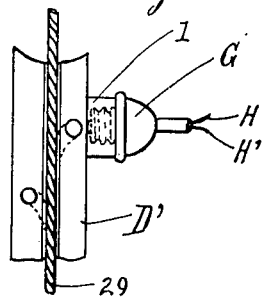
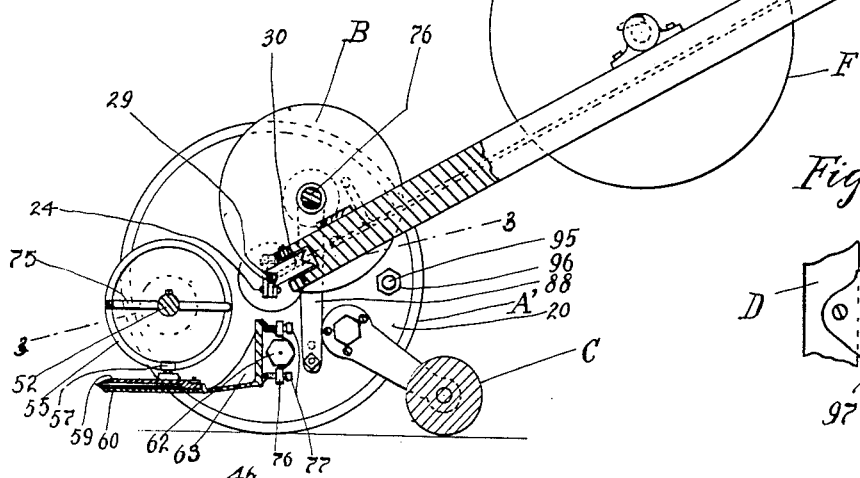
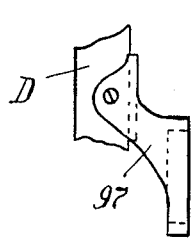
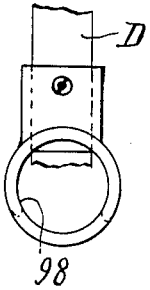
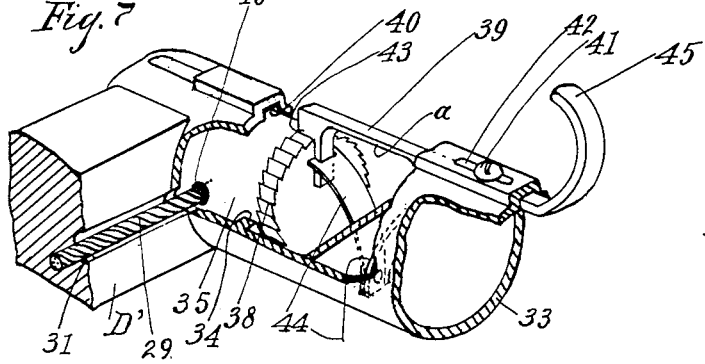
Inventor;
Emil E. Yost.
by A. S. Johnson
his Attorney.

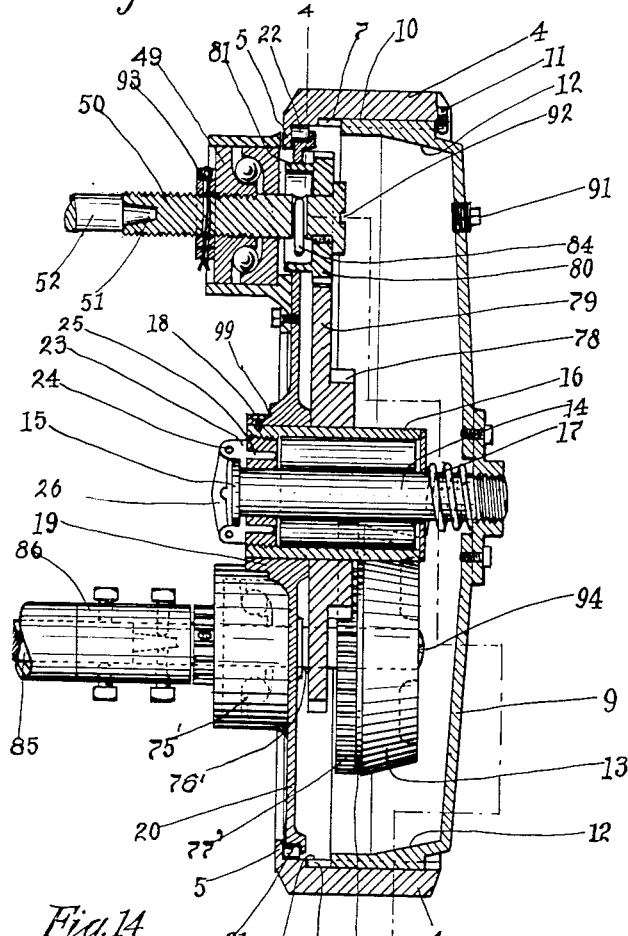
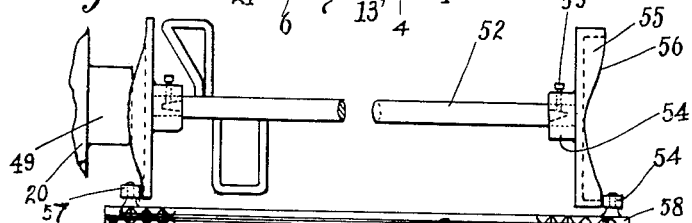
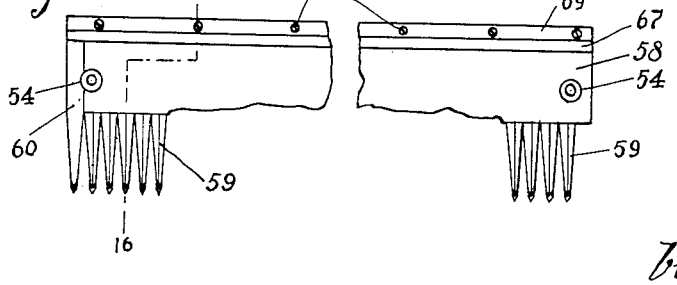

E. E. YOST.
POWER DRIVEN LAWN MOWER.
APPLICATION FILED JUNE 7, 1920.
1,387,578.
Patented Aug. 16, 1921.
4 SHEETS—SHEET 4.
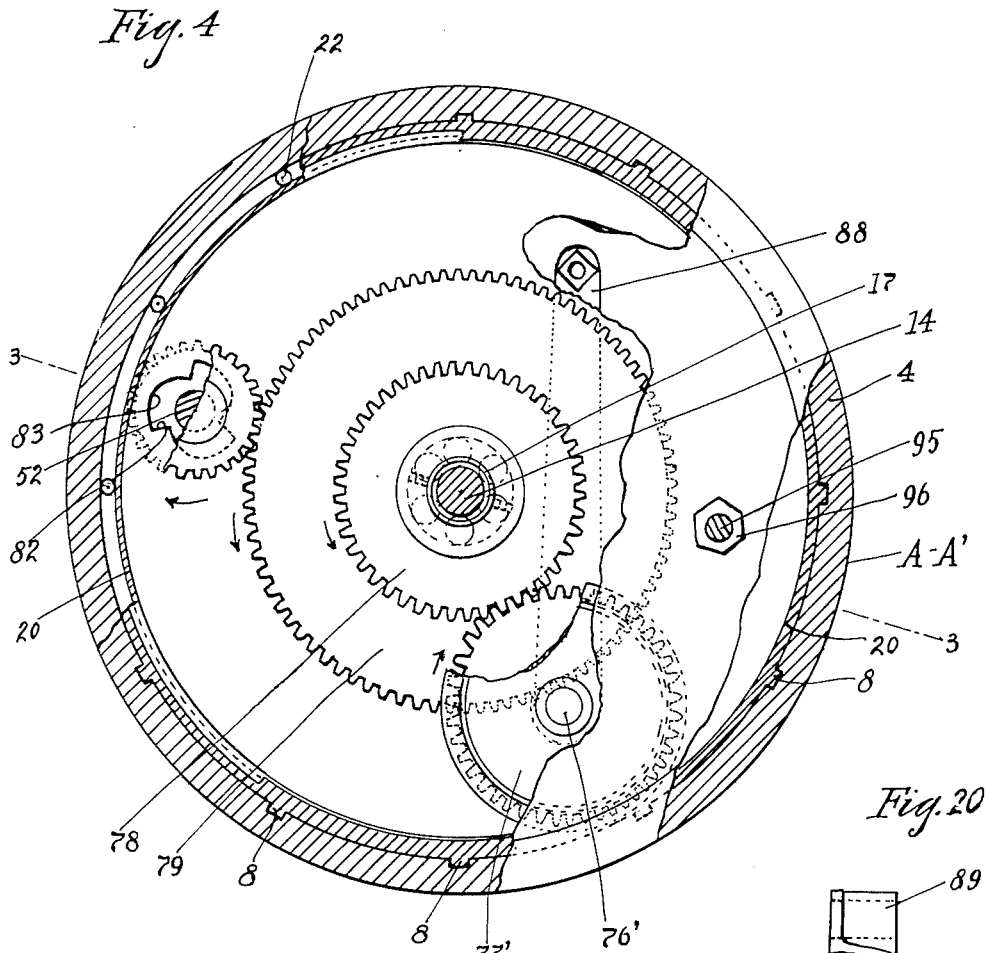
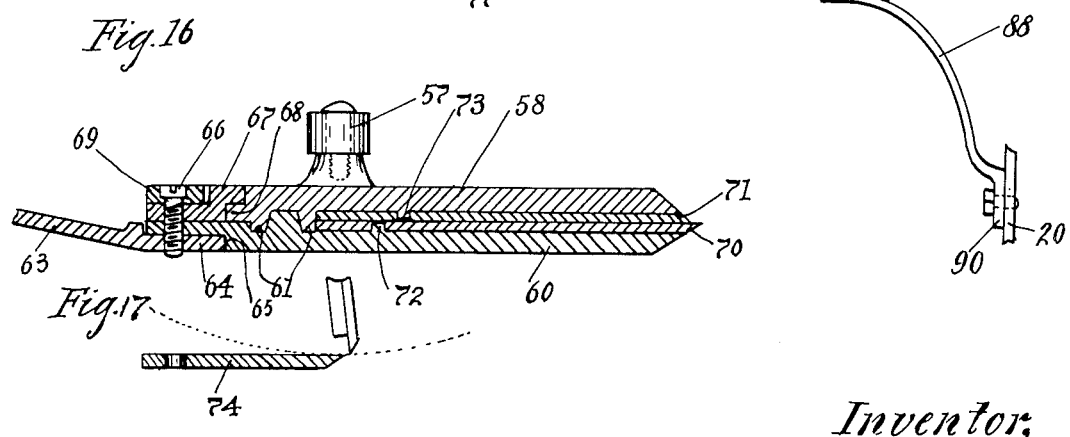
Inventor;
Emil E. Yost.
by A. S. Johnson
his Attorney.

UNITED STATES PATENT OFFICE.

EMIL E. YOST, OF ST. PAUL, MINNESOTA.

POWER-DRIVEN LAWN-MOWER.

1,387,578.  Specification of Letters Patent.  Patented Aug. 16, 1921.

Application filed June 7, 1920. Serial No. 387,114.

*To all whom it may concern:*

Be it known that I, EMIL E. YOST, a citizen of the United States, residing at St. Paul, in the county of Ramsey and State of Minnesota, have invented certain new and useful Improvements in Power-Driven Lawn-Mowers, of which the following is a specification.

This invention relates to power driven lawn mowers and more particularly to electrically driven mowers, an object of the invention being to provide an improved electrically driven mower controlled solely from the handle bar to apply power selectively, as to degree for conveying the machine over the ground, to either wheel alone or to both at the will of the operator, certain novel features of construction being provided to effect a yielding movement between the power mechanism and the driven wheels to accommodate varying working conditions.

Another object of the invention is to provide a power driven mower wherein the supports for the cutting element are constructed to operatively hold either a rotary or a reciprocatory cutting device such as the usual spiral reel or the reaper knife. Other advantages will be pointed out throughout the specification.

To this end the invention consists in the construction, combination and arrangement of parts hereinafter described and claimed. In the drawings:

Figure 1 is a top view of the invention.

Fig. 2 is a side view of same partly in section.

Fig. 3 is a sectional view of the wheel A (Fig. 1) on line 3—3 of Fig. 2.

Fig. 4 is a sectional view on line 4—4 of Fig. 3.

Fig. 5 is a front view partly in section of the handle bar.

Fig. 6 is a sectional view on line 6—6 of Fig. 5.

Fig. 7 is a fragmentary perspective view of a part of the handle bar showing the ratchet mechanism in the interior thereof.

Fig. 8 is a fragmentary side view of a part of one of the handle rails.

Fig. 9 is a side view of one of the pivot brackets for the handle.

Fig. 10 is a front view of the same.

Fig. 11 is a sectional view on line II—II of Fig. 5.

Fig. 12 is a fragmentary view partly in section of a part of the ratchet mechanism within the handle bar.

Fig. 13 is a front view of the central portion of the outer shell of the wheels.

Fig. 14 is a fragmentary front view of the reaper knife showing the cams for actuating the same.

Fig. 15 is fragmentary top view of the reaper knife alone.

Fig. 16 is an enlarged sectional view on line 16—16 of Fig. 15.

Fig. 17 is a sectional view of the stationary cutter blade used for the ordinary rotary spiral reel, a fragment of the cutting edge of the latter being shown.

Fig. 18 is a fragmentary perspective view of a part of the movable part of the reaper knife.

Fig. 19 is a fragmentary perspective view of one of the cutting blades proper of the movable part of said reaper blade.

Fig. 20 is a side view of one of the motor supporting brackets.

Fig. 21 is a view of the yoke to which the cable is attached, and

Fig. 22 is a diagrammatic view of the wiring.

In the drawings A and A' designate the supporting wheels, B a motor for driving the latter, C a trailing roller to the rear of the traction wheels to act as a stabilizer for the mechanism carried by the latter to hold it in a fixed relation to the ground, D and D' the propelling handle side rails, and E the handle bar of the mower. F designates a reel designed to carry a quantity of current conducting wire, the reel being provided for the purpose of housing the wire when not in use. This wire is connected with a distant source of current and has at its free end the connecting plug G, the latter being connected in the usual way with the socket 1 on the under side of the side rail D'. The socket is connected in the usual way with the conductors H and H' as at 2 and 2', said conductors being embedded in the side rail D' (Fig. 11) the latter being split and friezed for that purpose, said conductors leading to the switch 1 and being connected therewith so that when the switch arm 3 is positioned, as shown in Fig. 5, the current in the wire will cease to flow. The wires extend downwardly through the major part of the side rail and connect with the motor B in the usual manner. The traction wheels A and A' are each comprised of an outer comparatively thick rim member 4 adapted to roll on the ground, said rim member being formed with an inwardly extending flange 5, the inner wall 6 of said rim extending from the base of said flange 5 being of uniform diameter and having a plurality of grooves 7 spaced circumferentially and extending parallel with the central axis of the rim 4. Fitting slidably into the interior of the rim 4 and having on its circumferential surface the ribs 8, slidably fitting the grooves 7, is the axle supporting wheel web member 9, the circumferential face 10 of said web member being slightly narrower than the depth of the wall 6 so that said web member may be slid laterally back and forth in said rim. Screws 11 projecting through the rim 4 serve to retain said axle support positioned. Interiorly the axle supporting member is formed with a conic wall 12 adapted to contact, when slid inwardly, with the circumferential surface 13 of the friction wheel 13' forming part of the mechanism to be hereinafter described. Extending rigidly from the center of the axle support 9 is the axle pin 14 having a head 15, the roller bearing 16 surrounding said axle pin to form a journal therefor. Between the member 9 and the roller bearing 16 is the coil spring 17 surrounding the axle pin and tending constantly to push the member 9 outwardly away from said roller bearing. The roller bearing is firmly held, by means of the screw 18, in the hub 19 of the supporting disk 20, the latter being formed with a circumferential recess 21 adapted to receive the anti-friction rollers 22, so that the latter will roll on the wall 6 and the bottom of said recess when the reel 4 is caused to be turned, the position of the rollers being best shown in Fig. 4 of the drawings, the rollers being held positioned circumferentially in a circular seat and endwise by the flange 5 of the rim, as is clearly shown in Figs. 3 and 4 of the drawings. Thus, the supporting disk 20 forms the inner wall of the traction wheel and the axle support 9 the outer wall thereof. Extending under the head 15 of the axle pin 14 is the ring 23 having oppositely disposed eyes 24 and inwardly extending pins 25 the latter extending parallel with the axle pin and fitting slidably in the inner end wall of the shell of the roller bearing 16. A yoke 26 having eyes registering with the eyes 24 of the ring 23 (Fig. 21) to receive screws whereby it is firmly connected therewith, is connected by means of a link 27 with the hook 28 secured to the cable 29. When the cable is caused to be pulled the collar 23 will draw the axle pin 14 lengthwise through the roller bearing 16 and thereby move the axle supporting member 9 inwardly, the latter sliding in the groove 7 of the rim 4 until the conic face 12 thereof engages the face 13 of the friction wheel 13'. The cable 29 occupies a position coincident with the center of rotation of the traction wheels A and A' as is clearly shown in Fig. 2 of the drawings, and engages the sheave wheel 30 mounted, one at the lower end of each of the side rails D of the handle. The side rails are formed with a groove 31 on their inner sides to receive the cable which extends throughout the length of said side rails and through the opening 32 in the tubular cross bar or casing 33 forming part of the handle bar. The cross bar 33 is rigidly secured to the tops of the side bars D and D' and is formed interiorly with spaced annular bearing rings 34 forming journals for the hollow rotatable handle bar members 35, said members being oppositely disposed and having journal bearing in the cross bar 33 at 36 thereof. The handle bar members 35 are each provided with a handle 37 whereby the hollow member 35 may be rotated at the will of the operator. The members 35 project inwardly beyond said annular rings 34 and are formed at their opposite inner ends with ratchet teeth 38 (Fig. 7) forming part of a ratchet wheel, each ratchet wheel being provided with laterally sliding spring pawls 39, said pawls being oppositely disposed and offset with reference to each other so as to overlap each other as shown in Fig. 5 of the drawings.

The handle bar casing 33 is formed with an interior seat 40 adapted to slidingly receive said spring pawls 39, the latter being held positioned therein by the retaining screw 41 operating in a slot 42. Each of the pawls is formed with a nose 43 (Fig. 12) adapted to ride over the teeth 38 of the ratchet wheel when the latter is turned, so as to hold the respective handle bars positioned. A spring 44 keeps the pawls constantly in mesh with the ratchet wheel each pawl being provided with a thumb hook 45 whereby the ratchet may be bodily moved laterally against the spring 34 to disengage the nose 43 from the teeth of the ratchet wheel. The upper extremity of each of the cables extends through the opening 46 in the handle bar member 35 and is suitably anchored within the latter as by means of the pins 47. Thus, when the handle bars are turned by the operator the cable will thereby be wound on the outside of the members 35, thereby pulling the axle pin 14 laterally together with the axle supporting member 9 to engage the friction wheel surface 14. Thus either of the friction wheels may be operatively connected with its respective members 9 or 9' or both simultaneously at the will of the operator. It will be noted in Fig. 7 of the drawings that the spring pawl 39 is reduced in thickness at *a* to permit the latter to bend outwardly during the rotation of the ratchet wheel. By turning either of the handles 37 the cable is brought in tension against the spring 17 and held so by the pawl 39, the friction surface 13 being pressed against the surface 12 more or less hard, depending upon the amount of rotary movement imparted to the handles 37. When it is desired to release either of the traction wheels from the influence of the friction wheel surface 13, the respective finger hooks 45 are actuated when the handle 37 will be released. Rotatably supported by means of the roller bearing 49 on the supporting disk 20 is the spindle 50 having a taper socket 51 at its outer end. Frictionally fitting into said socket and extending across the machine to the opposite supporting disk 20, is the shaft 52 secured on the spindle 50 by means of a set scew 53 extending through the hub 54 of the cam disk 55, as shown in Fig. 14. Each cam disk is formed with a cam surface 56 designed to engage rollers 57 rotatably mounted on the top of the movable cutter blade member 58 the latter being formed with forwardly extending teeth 59. The member 58 is adapted to slide laterally over the top of the stationary cutter blade member 60, the latter being formed with a pair of spaced grooves 61 into which the undersurface of the member 58 is formed to fit.

Pivotally mounted on the supporting disk 20 by means of the pivot 62 is the cutter blade support 63, the latter being formed with a lip 64 abutting against the shoulder 65 of the member 60, the member 60 being held positioned by a plurality of screws 66 screw threadedly engaging the lip 64. Overlying the member 60 is the clamp strap 67, the latter being undercut throughout its length extending from wheel to wheel of the machine to receive slidably the lip 68 of the member 58 of the cutter blade, a retaining strap 69 serving as an additional clamping member in the form of an elongated washer. On the inner opposite faces of the members 58 and 60 are the steel cutting blades 70 and 71 respectively, which are removably held positioned on said members by the pins 72 and 73 spaced laterally on said members, the blade 71 being provided with openings 73 to fit said pins. The cutting blades 70 and 71 may be removed from the machine for the purpose of sharpening, the blades being conveniently filed along the cutting edges and then replaced in the machine. When the blade 71 becomes too short due to frequent sharpening the second hole 73 may be used moving the blade bodily forwardly to afford further filing. Thus, the entire cutter blade mechanism may be removed by the removal of the screws 66. When a spiral reel is to be used the blade 74 is substituted.

When the cam members 55 are caused to be rotated the cutter member 59 will be rapidly reciprocated laterally, the throw of the cams corresponding to the pitch of the teeth. On the shaft 52, as shown best in Fig. 1 of the drawings, are a plurality of spaced wire loops 75, which, when rotated are adapted to remove the accumulated grass on the top of the reaper knife. The cutter blade support 63 extends from the disk support 20 of one traction wheel to that of the other, each of said disk supports having a pair of lugs 76, having screw threaded engagement with set screws 77 whereby the blade support may be set and locked upon its pivot.

Journaled as by means of a roller bearing 75', one in each of the disk supports W, is the stub shaft 76', the roller bearing therefor and the outer end thereof being exactly similar to the bearing and shaft 49 and 50 (Fig. 3). On its inner end is rigidly mounted the friction wheel 13' preferably joined to the gear 77', the latter meshing with the gear 78 carried by the gear 79, the latter meshing with the gear 80, thus, constituting a gear train. The gear 79 is mounted so as to rotate on the outer surface of the roller bearing 16 so that when power is applied to the gear 77' the gear 80 will be driven. The gear 80 is rotatably mounted on the stub shaft 50, and is formed with a hollow hub 81, formed to constitute the usual sliding pin clutch. The clutch comprises the usual shoulders 82 (Fig. 4) the latter being radially disposed and flanked by the curved cam faces 83 converging toward the center of the shaft 50, the latter being diametrically pierced by a clutch pin 84 loosely slidable therein so as to engage said shoulders and cam faces to actuate said shaft to drive it in one direction only.

Connected to the shaft 76' in the same manner as the shaft 52 is connected to the shaft 51, is the motor shaft 85 surrounded by a sleeve 86 telescoping over both shafts and having set screws to firmly secure the shafts together. Mounted firmly on the shaft is the armature (not shown) of the motor B, the stationary outer part 87 of the motor being firmly held by means of the oppositely disposed brackets 88, the latter having hubs 89 in which the shaft 85 rotates, and bolt lugs 90 whereby the brackets are firmly screwed to the respective disk supporting members 20. When the switch lever 3 is positioned, as shown in Fig. 1, the motor becomes energized thereby driving the gear train in the direction designated by the arrows (Fig. 4). The shaft 52 with the loops 75 forms what may be termed a rotary rake, rotating in the same direction as does the usual spiral reel of the ordinary lawn mower thereby throwing the grass rearwardly.

In the outer wall of the axle support 9 is a threaded plug 91, which may be conveniently removed for the purpose of entering a screw driver whereby the screw slot 92 in the stub shaft 50 may be engaged to back the latter out sufficiently to free the shaft 52 when it is desired to replace the rake with an ordinary spiral cutter, the lock nut 93 having first been loosened. The motor may thus also be removed by having the screw slot 94 in the end of the shaft 76.

In operation the handles E are turned to apply power to either or both of the traction wheels as desired as has hereinbefore been described the reaper knife running constantly as long as the electric circuit is held closed, the pin clutch permitting the mower to be pulled bodily backward over the ground.

For the purpose of firmly holding the disk supporting members 20 relatively positioned so as to form as a whole a rigid frame carrying the motor B, the reaper knife, the rotary rake above it and the trailer roll C, the stay bolt 95 is provided extending across the machine and being firmly bolted in the members 20 by means of the nuts 96. The handle bar is pivoted to the frame by means of the brackets 97, formed with a bore 98 adapted to rotatably fit the recess 99 of the respective members 20.

I claim:

1. A power driven lawn mower, comprising a frame, a pair of supporting wheels therefor rotatable thereon, a propelling handle pivoted on said frame, a trailer roll to the rear of said wheels to hold said frame in fixed relation to the ground, a rotary rake axially parallel with said wheels, spindles on opposite ends of said rake rigidly connected thereto and axially alined therewith, grass cutting mechanism forward of and below the axis of said wheels, a switch controlled electric motor connected with a source of electric current and operatively connected with said spindles to rotate them, and driving means for said grass cutting mechanism extending from said spindles to the latter for the purpose set forth.

2. A power driven lawn mower, comprising a frame, a pair of supporting wheels therefor, a propelling handle including a handle bar pivoted on said frame, a trailer roll to steady said frame relative to the ground, grass cutting mechanism forward of and below the axis of said wheels, an electric motor connected with a switch controlled from the handle bar to render it operative or inoperative, a connection with a source of electric current for said switch, means operatively connecting said motor with said grass cutting mechanism to actuate the latter when the motor is energized, and means operatively connected with said motor and said handle bar and operable by the operator thereat a part of said means forming a part of said wheels, whereby the latter may be jointly or each separately held connected with said motor to be driven thereby.

3. A power driven lawn mower, comprising in part a frame, a pair of supporting wheels therefor, a propelling handle pivoted to said frame, a trailing roll to the rear of the axis of said wheels to steady said frame on the ground, grass cutting mechanism forward of the axis of said wheels, a motor operatively connected with said mechanism to actuate it, controlling means for said motor to render it operative or inoperative, and a normally ineffective friction wheel for each supporting wheel axially parallel with the axis of the latter and driven by said mechanism, the web of each of said supporting wheels being slidable laterally in its rim and formed to engage its friction wheel to be driven thereby when said web is slid toward the latter, and means operable from the handle bar for sliding said web.

In testimony whereof I affix my signature.

EMIL E. YOST.